(12) United States Patent
Ulf et al.

(10) Patent No.: US 6,854,171 B2
(45) Date of Patent: Feb. 15, 2005

(54) METHOD FOR PRODUCING A BENDING-RESISTANT, ELONGATED BODY

(75) Inventors: Jervant Ulf, Åmål (SE); Max Krogager, Linköping (SE)

(73) Assignee: Megtec Systems Amal AB, Amal (SE)

( * ) Notice: Subject to any disclaimer, the term of this patent is extended or adjusted under 35 U.S.C. 154(b) by 87 days.

(21) Appl. No.: 10/055,897

(22) Filed: Jan. 28, 2002

(65) Prior Publication Data

US 2002/0066173 A1 Jun. 6, 2002

Related U.S. Application Data

(63) Continuation of application No. 09/445,450, filed as application No. PCT/SE98/01144 on Jun. 15, 1998, now abandoned.

(30) Foreign Application Priority Data

Jun. 16, 1997 (SE) ................................................ 9702284

(51) Int. Cl.$^7$ ............................ B21K 21/16; F16C 3/00
(52) U.S. Cl. ...................... 29/401.1; 29/458; 29/447; 29/897.35; 29/419.1; 464/181; 464/179
(58) Field of Search ................................. 29/401.1, 458, 29/895.212, 895.21, 895.2, 447, 889.71, 419.1, 897.35; 492/53, 56, 60, 69; 156/294, 252; 464/181, 179, 180, 183; 74/501.5 R; 52/720.1; 428/406; 228/126, 128, 131; D25/126

(56) References Cited

U.S. PATENT DOCUMENTS

| 1,125,163 A | 1/1915 | Page ........................ 428/614 |
| 1,628,759 A | 5/1927 | Worrall .................... 428/614 |
| 2,887,762 A | 5/1959 | Dobell .................... 29/897.35 |
| 3,088,561 A | 5/1963 | Ruzicka .................... 52/737.4 |
| 3,187,422 A | 6/1965 | Morgan ..................... 29/419.1 |
| 3,419,952 A | 1/1969 | Carison ..................... 228/164 |
| 3,487,518 A | 1/1970 | Hopfeld .................... 29/897.35 |
| 3,508,990 A * | 4/1970 | Marzocchi ................. 156/166 |
| 3,623,203 A | 11/1971 | Henshaw et al. ......... 29/897.35 |
| 3,699,623 A | 10/1972 | Kreider .................... 29/889.71 |
| 3,820,212 A | 6/1974 | Spaeder, Jr. ................. 29/148 |
| 3,889,579 A * | 6/1975 | Wiechowski et al. ............ 92/3 |
| 3,941,435 A | 3/1976 | Tuomaala ..................... 308/20 |
| 3,942,231 A | 3/1976 | Whitaker ................... 29/889.7 |
| 3,945,555 A | 3/1976 | Schmidt ..................... 228/126 |
| 3,953,637 A * | 4/1976 | Phillips ..................... 428/156 |
| 4,111,606 A | 9/1978 | Prewo ........................ 416/224 |
| 4,169,186 A * | 9/1979 | Tazaki et al. ............... 428/406 |
| 4,314,007 A | 2/1982 | Gessinger .................... 428/614 |
| 4,589,176 A | 5/1986 | Rosman et al. .......... 29/889.71 |

(List continued on next page.)

FOREIGN PATENT DOCUMENTS

| GB | 2 059 546 | 4/1981 | |
| JP | 5176656 A | 7/1993 | .......... A01K/66/00 |
| NO | 850361 | 1/1985 | |

*Primary Examiner*—Marc Jimenez
(74) *Attorney, Agent, or Firm*—Mitchell D. Bittman; Kevin S. Lemack

(57) ABSTRACT

The present invention provides a method for producing a bending-resistant, elongated body, preferably a shaft or beam. The invention is characterized in that an elongated blank is produced having at least one cavity extending essentially along the entire length of the blank, the inner surface of which cavity is at a distance from the mass center of the blank seen in a section at right angles to its longitudinal axis and that affixed in the cavity is a fiber composite body with an outer surface essentially congruent with the inner surface of the cavity and that majority of the fibers in the fiber composite body both extend essentially parallel to the longitudinal axis of the elongated blank and are elongated along the whole of its length. The invention also relates to an arrangement produced according to the method.

10 Claims, 1 Drawing Sheet

U.S. PATENT DOCUMENTS

| | | | |
|---|---|---|---|
| 4,631,973 A | 12/1986 | Eley | 29/447 |
| 4,793,042 A | 12/1988 | Easter | 156/294 |
| 4,841,613 A | 6/1989 | Beery et al. | 29/130 |
| 4,900,599 A | 2/1990 | Doble | 428/65 |
| 5,049,036 A | 9/1991 | Bailey et al. | 29/889.71 |
| 5,129,979 A | 7/1992 | Nakayama et al. | 156/294 |
| 5,207,848 A | 5/1993 | Mahoney et al. | 156/294 |
| 5,411,463 A | 5/1995 | Brookstein | 492/38 |
| 5,427,304 A | 6/1995 | Woods et al. | 29/423 |
| 5,531,537 A | 7/1996 | Pink et al. | 29/447 |
| 5,551,138 A | 9/1996 | Grajewski et al. | 29/447 |
| 5,576,081 A * | 11/1996 | Sandt | 428/36.9 |
| 5,664,890 A * | 9/1997 | Nowak et al. | 384/282 |
| 6,019,860 A | 2/2000 | Turler et al. | 29/447 |
| 6,030,157 A | 2/2000 | Erpenbeck | 156/294 |
| 6,112,410 A | 9/2000 | Rastegar | 29/897.35 |

* cited by examiner

METHOD FOR PRODUCING A BENDING-RESISTANT, ELONGATED BODY

This is a continuation of Application No. 09/445,450 filed Feb. 15, 2000, now abandoned, (which in turn is a 371 of PCT/SE98/01144) filed 15 Jun. 1998. The disclosure of the prior application(s) is hereby incorporated by reference herein in its entirety.

BRIEF SUMMARY OF THE INVENTION

The present invention relates to a method for producing a bending-resistant, elongated body, preferably a shaft or beam.

The invention also relates to an arrangement for a bending-resistant, elongated body, preferably a shaft or beam.

BACKGROUND OF THE INVENTION

On paper making machines, for example, relatively long shafts occur, which serve inter alia as spindles for carrying paper reels. These are now often manufactured as homogeneous or tubular aluminium or steel shafts, possibly with longitudinal circumferential recesses for air-activated clamping segments or the like. It is understood that a shaft of this kind can have a relatively great mass even in the case of comparatively short lengths, especially if the shaft is to carry large loads. On rotation, a shaft of this kind can also come to produce natural frequencies in the speed range which is relevant for this type of application and by doing so possibly limit the velocity of the paper web. In addition, these shafts must often be handled manually when exchanging reels or the like, which means risking coming into conflict with working environment requirements imposed with regard to lifting heavy objects. In the case of large lengths and high stresses, it can also be difficult to obtain sufficient bending resistance with shafts produced according to the prior art.

One aim of the present invention is therefore to provide a method for producing a bending-resistant, elongated body, preferably a shaft or beam, and an arrangement for a bending-resistant, elongated body, which method and which arrangement contribute to eliminating or at any rate reducing the aforementioned problems.

According to an embodiment of the present invention, a method is achieved for producing a bending-resistant, elongated body, preferably a shaft or beam.

An arrangement for a bending-resistant, elongated body, preferably a shaft or beam, is also achieved according to the present invention.

Preferred embodiments of the method or arrangement have in addition one or some of the features indicated in the respective sub-claims.

The method or arrangement according to the invention have several advantages. By means of the method according to the invention, a bending-resistant, elongated body can be produced, preferably a lightweight shaft or beam, the bending resistance of which is considerably increased and the natural frequency of which can be adapted to the current application.

BRIEF DESCRIPTION OF THE DRAWINGS

The invention is to be explained in greater detail below by way of examples of embodiments of the invention and the arrangement and with reference to the enclosed drawings.

DETAILED DESCRIPTION OF THE DRAWINGS

Figure 1:
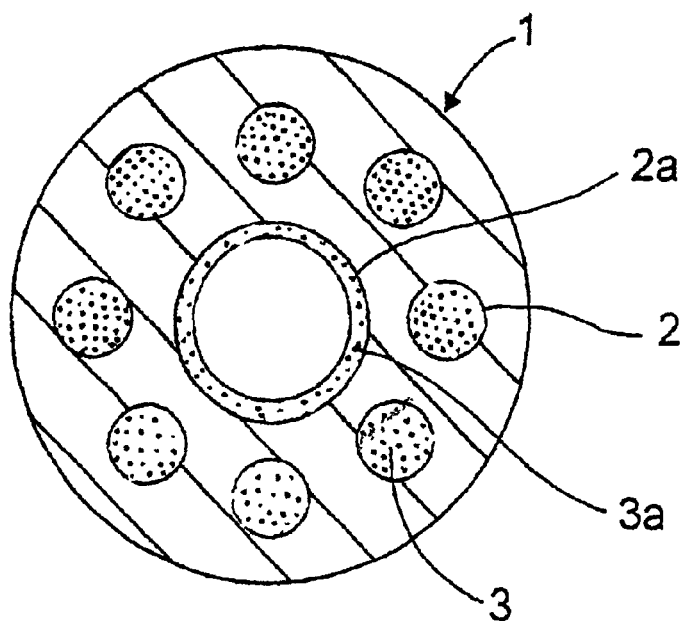
FIG. 1 shows a first embodiment of a bending-resistant, elongated body according to the invention in the form of a shaft, in a section at right angles to its longitudinal axis.

In FIG. 1, 1 generally describes a bending-resistant, elongated body in the form of a circular shaft of the type which is suitable as a spindle in a paper making machine or the like, for example. The circular shaft 1 has a number of circular cavities 2, 2a, extending essentially along the whole of its length, the inner surfaces of which, in a section at right angles to its longitudinal axis, are at a distance from the mass centre of the section. One of these cavities 2a is arranged concentrically around the mass centre of the section. In comparison with a homogeneous metal shaft, for example, the cavities considerably reduce the weight of the shaft. Fibre composite bodies 3, 3a are applied to the cavities 2, 2a, preferably by gluing, which bodies have outer surfaces essentially congruent with the inner surfaces of the cavities 2, 2a, which outer surfaces due to the affixing are joined to the inner surfaces of the cavities by affixing. The fibre composite bodies 3, 3a may be homogeneous, as in the cavities 2 lying circumferentially, or tubular, like the fibre composite body 3a, which is affixed in the hollow 2a arranged concentrically with the mass centre. The majority of the fibres in the fibre composite bodies 3, 3a extend essentially parallel to the longitudinal axis of the shaft 1 and are elongated along the whole of its length.

The fibre composite bodies 3, 3a consist preferably of carbon fibre in an epoxide matrix, but other fibres and matrices with similar properties are naturally conceivable. For gluing, an epoxy-, acrylic-, polyurethane- or phenolic-resin based adhesive is used.

When manufacturing the shaft according to FIG. 1, one starts by producing a elongated shaft blank with the cavities 2, 2a extending essentially along the entire length of the shaft 1. A fibre composite body 3, 3a, with an outer surface essentially congruent with the inner surface of the cavity is then fitted into each cavity 2, 2a. The majority of the fibres in the fibre composite body 3, 3a should hereby be oriented essentially parallel to the longitudinal axis of the elongated shaft blank and such that they are elongated along the whole of its length.

Figure 2:
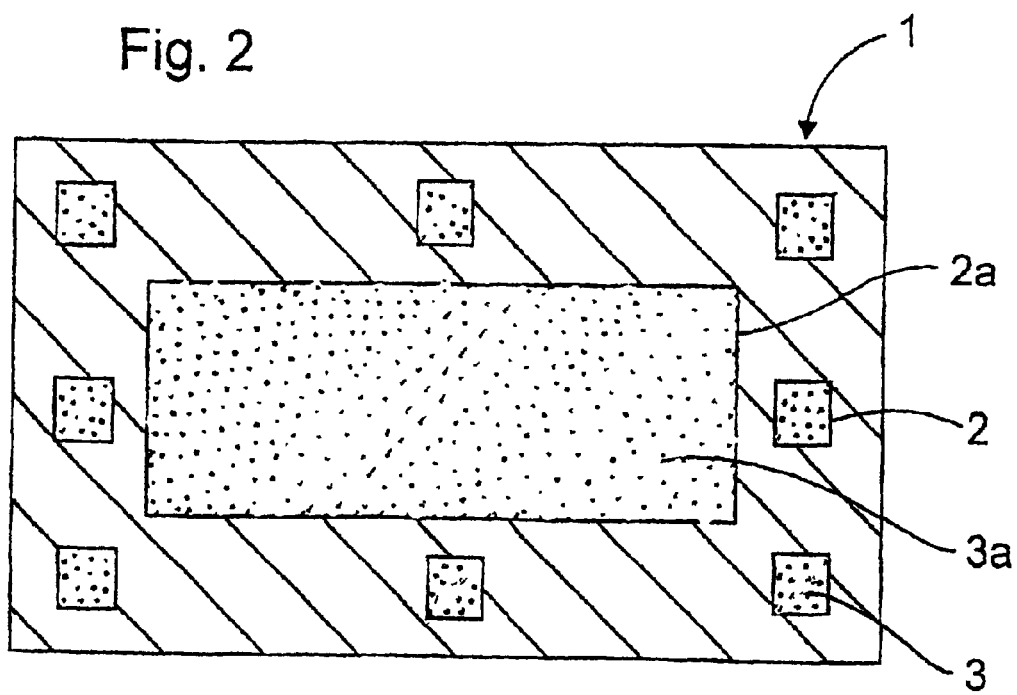
FIG. 2 shows a second embodiment of a bending-resistant, elongated body according to the invention in the form of a beam, in a section at right angles to its longitudinal axis.

In FIG. 2, 1 generally describes a bending-resistant, elongated body in the form of a rectangular beam. Like the shaft according to FIG. 1, the rectangular beam 1 has a number of cavities 2, 2a extending essentially along its entire length, the inner surfaces of which cavities, in a section at right angles to its longitudinal axis, are at a distance from its mass centre. As in the previous embodiment, one of these cavities 2a is arranged concentrically around the mass centre. In the cavities 2, 2a, as in the embodiment according to FIG. 1, fibre composite bodies 3, 3a are affixed, preferably by gluing, which bodies have outer surfaces essentially congruent with the inner surfaces of the cavities, which outer surfaces are joined by affixing to the inner surfaces of the cavities. The fibre composite bodies 3, 3a in all cavities are homogeneous in this embodiment. Here also the majority of the fibres extend essentially parallel to the longitudinal axis of the elongated body and are elongated along the whole of its length.

The production of the beam 1a according to FIG. 2 is performed in a corresponding manner to that for the shaft 1 according to FIG. 1.

Bending-resistant, lightweight shafts and beams of an arbitrary cross-section can be produced by the invention.

The bending resistance of these can be increased by arranging the inner surfaces of the cavities 2, 2a connecting to the outer surfaces of the fibre composite bodies 3, 3a at a greater distance from the mass centre and reduced in the reverse manner, seen in a section at right angles to the longitudinal axis of the shaft/beam. The above may also be utilized to give the shafts/beams according to the invention the desired natural frequency. In the case of rotating shafts, it is normally suitable for the cavities 2, 2a to be arranged with an equal pitch, symmetrically around the mass centre of the shaft seen in a section at right angles to its longitudinal axis, while in the case of a beam, varying bending resistance in different directions can be achieved through asymmetrical positioning of the cavities 2, 2a. Due to the fact that the fibre composite bodies 3, 3a are normally of a lower density than the material which is used for the elongated body, a basic reduction in weight is achieved compared with a homogeneous body of the same dimensions. To reduce the weight further, it is possible for certain applications to arrange further cavities 2, 2a, in which fibre composite bodies 3, 3a are not arranged.

It is evident to a man skilled in the art that the invention is not restricted to the embodiments described above, but that it can instead undergo modifications in the scope of the inventive idea defined in the following patent claims. For example, in the case of the embodiments according to FIG. 1 or FIG. 2 it is possible to arrange the fibre composite bodies 3, 3a solely in the cavities 2 lying circumferentially or alternatively only in the hollows 2a executed concentrically with the mass centre. It is understood also that the cavities 2, 2a can have an arbitrary cross-section and that the fibre composite bodies can be affixed in the cavities by shrinking.

What is claimed is:

1. Method of modifying the bending resistance of an elongated body comprising:

determining the desired bending resistance of said elongated body;

Providing an elongated blank having at least three cavities extending essentially along the entire length of the blank, said at least three cavities having a longitudinal axis, said at least three cavities being enclosed in said blank but for first and second spaced openings at opposite ends of said longitudinal axis, the inner surface of one of said at least three cavities is at a distance from the mass center of the blank seen in a section at right angles to its longitudinal axis and is arranged concentrically around said mass center, the blank being formed from a metallic material; locating the remainder of said at least three cavities in said elongated blank so as to achieve said desired bending resistance upon inserting fiber composite bodies formed from a plurality of fibers in a non-metallic material into at least one of said first and second openings of the at least three cavities; and affixing in the cavities the fiber composite bodies with an outer surface essentially congruent with the inner surface of said at least three cavities, wherein a majority of fibers in the fiber composite bodies both extend essentially parallel to the longitudinal axis of the elongated blank and are elongated along the whole of its length.

2. Method according to claim 1, wherein the step of affixing comprises gluing the fiber composite bodies into the at least three cavities.

3. Method according to claim 2, wherein that epoxy-, acrylic-, polyurethane- or phenolic-resin-based adhesive is used for gluing.

4. Method according to claim 1, wherein the step of affixing comprises shrinking the at least three cavities to the fiber composite bodies.

5. Method according to claim 4, wherein the step of producing the blank produces a blank that is a shaft with a number of longitudinal cavities, which are arranged with equal pitch, symmetrically around the mass center of the blank seen in a section at right angles to its longitudinal axis.

6. Method according to claim 4, wherein the step of producing the blank produces a blank that is a beam with a number of longitudinal cavities, which are arranged asymmetrically around the mass center of the blank seen in a section at right angles to its longitudinal axis, so as to produce varying bending resistance in different directions of applied force.

7. Method according to claim 1, wherein carbon fiber in an epoxide matrix, is used as the fiber composite body.

8. The method of claim 1 wherein the outer surface of the fiber composite bodies are affixed to the inner surface of the cavities by gluing.

9. The method of claim 1, wherein said fiber composite body is tubular having a central bore devoid of fibers.

10. A method for modifying the bending resistance of an elongated body, the method comprising:

determining the desired bending resistance of said elongated body;

forming an elongated blank having at least three cavities extending essentially along the entire length of the blank, said at least three cavities having a longitudinal axis, said at least three cavities being enclosed in said blank but for first and second spaced openings at opposite ends of said longitudinal axis, the inner surface of one of said at least three cavities being at a distance from the mass center of the blank seen in a section at right angles to its longitudinal axis and arranged concentrically around said mass center, the blank being formed from a metallic material, locating the remainder of said at least three cavities in said blank so as to achieve said desired bending resistance;

forming fiber composite bodies from fibers extending essentially parallel to the longitudinal axis of the fiber composite body and extending essentially along the length of the fiber composite body by inserting said fiber composite bodies into at least one of said first and second openings, the fibers embodied in a matrix; and affixing an outer surface of the fiber composite bodies to the inner surface of the cavities of the elongated blank.

* * * * *